United States Patent [19]

Heisel et al.

[11] Patent Number: 4,795,620
[45] Date of Patent: Jan. 3, 1989

[54] CLAUS RESIDUAL GAS CLEANUP USING TETRAETHYLENE GLYCOL DIMETHYL ETHERS AS SO₂ SCRUBBING AGENT

[75] Inventors: Michael Heisel, Munich; Gerhard Linde, Gruenwald, both of Fed. Rep. of Germany

[73] Assignee: Linde Akitengesellschaft, Wiesbaden, Fed. Rep. of Germany

[21] Appl. No.: 20,182

[22] Filed: Feb. 27, 1987

Related U.S. Application Data

[63] Continuation of Ser. No. 861,127, May 7, 1986, abandoned, which is a continuation of Ser. No. 652,538, Sep. 20, 1984, abandoned.

[30] Foreign Application Priority Data

Sep. 20, 1983 [DE] Fed. Rep. of Germany ....... 3333933

[51] Int. Cl.⁴ .............................................. C01B 17/00
[52] U.S. Cl. ....................................... 423/243; 55/73; 423/574 R; 423/573.1
[58] Field of Search ............... 423/243, 573 G, 574 R, 423/574 G, 576; 55/73

[56] References Cited

U.S. PATENT DOCUMENTS

| | | | |
|---|---|---|---|
| 2,139,375 | 12/1938 | Millar et al. | 423/243 X |
| 3,353,732 | 10/1970 | Moore et al. | 55/73 |
| 3,503,186 | 3/1970 | Ward, III | 55/73 X |
| 4,113,849 | 9/1978 | Atwood | 423/574 R |

FOREIGN PATENT DOCUMENTS 3237388 4/1984 Fed. Rep. of Germany .

OTHER PUBLICATIONS

"Use UCAP for Sulfur Recovery"; Hydrocarbon Processing; C. M. Yon et al.; Jul. 1979; pp. 197–200.
L. F. Albright et al., Chem. Engineering Progress Symposium Series 44, vol. 59, 66 (1963).
Goar, B. Gene, "Tail Gas Cleanup Process Technology", Energy Progress (vol. 6, No. 2) Jun. 1986, pp. 84–90.
Sames, John A., "Impact of Claus Plant Operation on Tail Gas Treating", Stretford Conference, Oct., 1987.
Kohl, Arthur L., Gas Purification, Third Edition Gulf Publishing Co., Copyright 1960, 1974, 1979.

Primary Examiner—John Doll
Assistant Examiner—Wayne A. Langel
Attorney, Agent, or Firm—Millen & White

[57] ABSTRACT

A process is disclosed for the purification of a gaseous stream contaminated at least with $CO_2$ and $H_2S$. The gaseous stream is preheated and subjected, in the presence of recycled $SO_2$, to a catalytic conversion of $H_2S$ into elemental sulfur. The thus-obtained sulfur is separated, and the residual gas, which contains at least $H_2S$, $SO_2$, $CO_2$, and water, is freed absorptively from $SO_2$ after oxidative conversion of $H_2S$ to $SO_2$. It is proposed that the residual gas, after oxidative conversion of $H_2S$ to $SO_2$, is cooled in heat exchangers, preferably regenerators, and is subsequently scrubbed with a solvent consisting predominantly of tetraethylene glycol dimethyl ether.

11 Claims, 2 Drawing Sheets

CLAUS RESIDUAL GAS CLEANUP USING TETRAETHYLENE GLYCOL DIMETHYL ETHERS AS SO₂ SCRUBBING AGENT

This application is a continuation of application Ser. No. 861,127, filed May 7, 1986, now abandoned, which is a continuation of application Ser. No. 652,538, filed Sept. 20, 1984, now abandoned.

BACKGROUND OF THE INVENTION

This invention relates to the field of purifying gaseous streams contaminated by $CO_2$ and $H_2S$ and possible other impurities, and generally involving the step of reacting $SO_2$ with $H_2S$ to form elemental sulfur.

In the process industries, it is frequently necessary to separate sour gases, understood to mean essentially $CO_2$, $H_2S$ and mercaptans, from a given gaseous stream. These compounds, which, due to their corrosive and catalyst-impairing properties, or for other reasons, must generally be maintained out-of-contact with downstream processing units. $CO_2$ and $H_2S$ are the predominant sour gases found in gaseous process streams, such as, in particular, natural gas or cracked gases.

Since in the separation of sour gases from raw gases, $H_2S$, in contrast to $CO_2$, must, due to its toxicity, not be discharged into the environment, or at least only in extremely low concentrations, the $H_2S$ component is conventionally processed into elemental sulfur in a downstream facility. However, inasmuch as the $CO_2$, relatively harmless to the environment, is merely an undesirable inert throughput in a sulfur-producing plant, scrubbing operations selective for $H_2S$ are utilized to a large extent for removing these sour gases from gaseous streams, thereby permitting the size of the sulfur-producing plant to be substantially decreased. At the same time a sufficiently high $H_2S$ concentration is achieved which ensures a stably burning flame in the Claus burner. In these scrubbing processes, a residual gaseous stream free of $H_2S$ and containing carbon dioxide can be obtained in the regeneration of the scrubbing medium, as well as, besides, a gaseous stream rich in hydrogen sulfide and containing part of the separated $CO_2$. This $H_2S$-free residual gas stream can be put to its final use, e.g. downstream processing units. Optionally, pure $CO_2$ for other usages can also be isolated from this stream.

Chemical as well as physical scrubbing methods have been developed for the selective separation. The physical scrubbing processes have been employed preferentially for many years to a large extent, particularly in the purification of gaseous streams relatively extensively contaminated by $CO_2$. The scrubbing liquids utilized in this connection dissolve the sour gas components without chemical reaction and can be regenerated from these components by expansion, heating and/or distillation.

The $H_2S$-enriched residual gas fraction obtained in the scrubbing step selective for $H_2S$ contains, depending on the hydrogen sulfide content of the gaseous stream to be purified, generally between 10 and 85 mol-% of $H_2S$ and is processed to elemental sulfur, for example, in a sulfur-production plant based on the Claus reaction

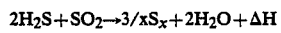

$$2H_2S + SO_2 \rightarrow 3/xS_x + 2H_2O + \Delta H$$

However, the conversion to elemental sulfur is never complete; rather, a residual gas containing $H_2S$ and $SO_2$ is obtained in all cases. Although most of the sulfur compounds separated from the gaseous stream are processed to elemental sulfur, the residual gas mostly still contains sulfur compounds in such concentrations as to prohibit their discharge into the atmosphere. For further details of the Claus process, reference is invited to the extensive literature on the subject, e.g., Kohl and Riesenfeld, *Gas Purification*, 3rd Edition, 1979, Gulf Publishing Co., Houston, Tex., incorporated by reference herein, especially pages 410–421, and "Sour Gas Processing and Sulfur Recovery", The Petroleum Publishing Company, Tulsa, Okla., 1979, page 65ff.

For the further purification of the Claus process residual gas, many systems have been suggested, including one wherein the residual gas, after cooling and sulfur separation, is subjected to oxidation in the presence of air and combustion gas. In this step, all hydrocarbons that may be present are oxidized to $CO_2$ and water, and all sulfur compounds are essentially oxidized to $SO_2$. The resultant gas is cooled and scrubbed in an absorber with triethanolamine which is selective for $SO_2$. The loaded solvent is freed in a stripper from $SO_2$ by lowering the pressure; the $SO_2$, saturated with water, is recycled into the raw gas stream upstream of the Claus reactor (*Hydrocarbon Processing*, July 1979, pp. 197–200).

However, this process has the serious disadvantage that the recycled $SO_2$, in all cases, also contains several ppm of the amine which, in case of incomplete combustion in the Claus installation, reacts and fouls the catalyst. Considering long-term operation, the heat exchangers can also be plugged up by the formation of carbamates and other ammonium compounds which, especially on the relatively cool parts of the installation, lead to insoluble deposits. Therefore, within a time frame that maybe as short as 2 months, the catalysts must be removed and the heat exchangers must be made serviceable again, with great expenditures in energy, time and money.

SUMMARY

Therefore, an object of one aspect of this invention is to provide an improved process as compared with the conventional processes.

According to another object of an aspect of the invention, several modifications of this improved process are also provided.

Upon further study of the specification and appended claims, further objects and advantages of this invention will become apparent to those skilled in the art.

To attain these objects, a process is provided wherein the residual gas is cooled in a heat exchanger, preferably against a process stream, and especially in a set of regenerators, after oxidative conversion of the $H_2S$ and $SO_2$. The resultant cooled residual gas is scrubbed with a solvent consisting predominantly of tetraethylene glycol dimethyl ether.

The combination of a heat exchanger, preferably as regenerators, for cooling the residual gas and a physical scrubbing step with tetraethylene glycol dimethyl ether in accordance with this invention affords great advantages. Thus, it is possible, by the use of the heat exchanger, to heat the purified gas from the $SO_2$ scrubbing step against hot $SO_2$ and $CO_2$ containing oxidation gases. The dispersion of the resultant hot purified gas in the atmosphere is thereby improved, and the effect of the $SO_2$ concentration, which is low anyway, is even further reduced. Also the need for fuel gas, which in some cases is required to heat the stack gas to the temperature necessary to meet regulations for off-gas distribution, is considerably diminished, in some cases down to zero.

The use of the preferred regenerators is very uncomplicated in general, and particularly as compared with the waste heat boiler utilized in the prior art process. The evolving impurities, namely water and elemental sulfur, hardly interfere with the cooling operation of the regenerators. Tube heat exchangers may substitute the regenerators. They have to be designed and installed in a way that condensing water and/or $SO_3$ do not impede the operation, i.e. that these liquids can flow downward out of the exchanger.

In total, a great simplification of the conventional Claus plant is attainable: In this case, only one reactor is utilized for conducting the Claus reaction, and one sulfur condenser is employed for separation of the elemental sufur, instead of, as has been done previously, utilizing the conventional Claus burner, waste heat boiler, first Claus reactor with condenser and heating unit, a second, and optionally third, Claus reactor with respective condenser and heat exchanger for reheating. Notwithstanding the comparatively simple facility utilized in the present invention, a sulfur recovery can be attained of about 99.9%. Since no Claus burner is required in this connection except in cases where deleterious substances, e.g. HCN, $NH_3$ are present in the feed and must be decomposed by burning, no COS and/or $CS_2$ is produced, and therefore sulfur recovery is inherently simplified right from the beginning of the process.

Also the control of the entire plant is made simpler, since no super precise maintenance of the stoichiometric ratio of $H_2S$ to $SO_2$ ($H_2S:SO_2=2$) is required. If this ratio is higher than 2, no problem occurs because the excess $H_2S$ is catalytically oxidized and recycled as excess $SO_2$. In turn, the recycled excess $SO_2$ will act to decrease or eliminate the excess $H_2S$. Thereby, the reduced combustion is automatically regulated. Conversely, if the ratio of $H_2S$ to $SO_2$ is smaller than 2, then excessive $SO_2$ is needlessly recycled, resulting in a volumetric throughput above design capacity or in the need for a larger plant design or surge capacity. For this reason, this operating condition should be avoided if at all possible. Irrespective of whether the actual $H_2S$:$SO_2$ ratio is larger or smaller than 2, the effective sulfur recovery of the plant does not suffer. This means that the plant can be used especially advantageously where fluctuations of the raw gas composition are to be expected, such as, for example, in refineries.

With a high $H_2S$ content in the raw gas, for example larger than 70 mol-%, a very large quantity of water is produced in the Claus reaction. In this case, it is advantageous not to rely on a heat exchanger alone, but instead to modify the process by adding a quenching tower incorporating water circulation in which the gas is cooled in direct heat exchange with water to about 40° C. Examples for this type of cooling are known, inter alia, from "Hydrocarbon Processing", April 1972, page 114.

The physical solvent used according to this invention offers the advantage of selective $SO_2$ absorption vis-a-vis $CO_2$ absorption, and simple regeneration ability. However, it is unavoidable herein that traces of solvent pass into the Claus installation together with the recycled $SO_2$. The solvent of this invention, however, is combusted in the Claus plant to $CO_2$ and water, so that the catalyst is not damaged by the solvent. Even if the Claus plant is operated in a bypass mode, no serious problems are encountered. Due to its low volatility, only a very small amount—for example 30 vppm (parts per million by volume) of the solvent in the recycled $SO_2$—is recycled into the Claus plant. Such low trace amounts do not cause any problem especially since at least a part of the solvent is decomposed, by way of the Claus catalyst, to the harmless components CO, $H_2$, $CO_2$, and water.

According to an advantageous embodiment, the residual gas is cooled in a heat exchanger, especially in regenerators, by heating up, directly or indirectly, purified gas before the latter is passed to the atmosphere, to temperatures of between 60° and 120° C. Prior to being cooled in the heat exchanger regenerators, the residual gas can, in a further modification of this invention, be cooled in heat exchange with contaminated gaseous stream, so that no additional energy costs are incurred for raw gas preheating. This version is suitable, above all, if the $H_2S$ content of the raw gas is very high, e.g., higher than 80 mol-%. Since the gas is then even hotter after the oxidative reaction, there is the possibility of saving heating energy.

The solvent proposed according to this invention has a low vapor pressure as compared with other absorbents, so that the scrubbing step can be performed at almost ambient temperature. Thus, the gas coming from the heat exchangers, preferably regenerators must be still further cooled. This can be done, for example, in indirect heat exchange with cooling water. On the other hand, however, there is also the possibility of utilizing the heat content of this hot gas for heating the regenerating column. This modification is used with great advantage, in particular, if the oxidative conversion of $H_2S$ to $SO_2$ in the residual gas takes place purely by a thermal incinerator which, in turn, can be economical especially in case of small gas quantities. This conversion, though, does require temperatures of, for example, 600° C. at the outlet of the combustion furnace. In a thermal incinerator, the residual gas is mixed with hot off-gas from the incinerator burner, where fuel gas, e.g. natural gas, is burned with a surplus of air. The surplus oxygen after the mixing reacts with the combustible components in the residual gas, i.e. especially with $H_2S$ to form $SO_2$ and traces of $SO_3$.

In accordance with this invention, the solvent by weight, consists essentially of at least about one-half of tetraethylene glycol dimethyl ether. In particular, the solvent consists essentially of, on a dry basis, 60–80% of tetraethylene glycol dimethyl ether; 15–25% of triethylene glycol dimethyl ether; 2.5–7.5% of pentaethylene glycol dimethyl ether; and 2.5–7.5% of mono ethers. This composition offers the advantage that the vapor pressure of the solvent is low. Furthermore, since the solvent does not contain any high-molecular weight homologs (with more than 6 ethylene groups), the viscosity of the solvent is sufficiently low that it can be recirculated without difficulties. In this connection, it is especially advantageous if the solvent, on a dry basis, consists essentially of 70% of tetraethylene glycol dimethyl ether; 20% of triethylene glycol dimethyl ether; 5% of pentaethylene glycol dimethyl ether; and 5% of mono ethers. Such a solvent is known e.g. from German Offenlegungsschrift No. 32 37 388.

When regenerators are employed, they are heated up during cooling of the oxidatively reacted gas to about 200°–300° C., depending on the raw gas composition. In order to cool the heated-up regenerators, another embodiment of the process of this invention provides the use of air and/or sulfur-free gas and/or residual gas prior to the oxidative conversion. In this connection, the number of regenerators is generally equal to that of the gaseous streams serving for cooling purposes +1.

Sulfur-free gas can be used advantageously, since, in this case, the purified gas can be discharged into the flue in the hot state. As mentioned above, this improves dispersion into the atmosphere and further lowers the effect of the trace amounts of $SO_2$. Residual gas prior to oxidative conversion can be heated with advantage by cooling the regenerators. However, care must be taken in this connection that no oxygen or $SO_2$ is present in the regenerator to be cooled, to prevent any deleterious buildup of elemental sulfur. This is attained, for example, by purging the regenerator for a short time—several seconds—with sulfur-free gas, and then conducting residual gas through the regenerator for cooling the latter. Of course, the aforementioned gaseous streams can also be utilized simultaneously but separately from each other, for cooling the regenerators.

The process of this invention is usable for purification of all gaseous streams which contain $H_2S$. If the raw gas contains components which must be combusted before entering the Claus plant, for example HCN, then, of course, a conventional, preferably again single-stage Claus facility can be arranged upstream of the $SO_2$-scrubbing. In the Claus burner, combustion must be conducted in this case with relationships that are even less stoichiometric than the less than stoichiometric relationships in a conventional Claus plant, since the recycled $SO_2$ is added downstream of the Claus burner and, after admixing $SO_2$, a ratio of $H_2S$ to $SO_2$ of close to 2 is to be attained. In such a case (HCN combustion), the heating of the gas freed of elemental sulfur can usually be omitted, since the heat available in the gas from the oxidative conversion is generally sufficient to heat the combustion air and/or the gas for the oxidative conversion to such an extent that the ignition temperature for the catatytic incineration, e.g., about 300° to 350° C. is attained even without the application of external heat, e.g., from a fuel gas.

In case of a very high $H_2S$ content in the raw gas, the gas after passing through the 1-stage Claus unit can in some instances still contain so much sulfur that it is self-combusting. Then the operation can be carried out without supplying external fuel gas.

In general, pure $O_2$ and/or oxygen-enriched air can also be utilized instead of air for heating or oxidative conversion of $H_2S$ into $SO_2$. This reduces the proportion of inert gas in the scrubbing column whereby the scrubbing effect and also the sulfur recovery are enhanced.

DETAILED DESCRIPTION

Figure 1:
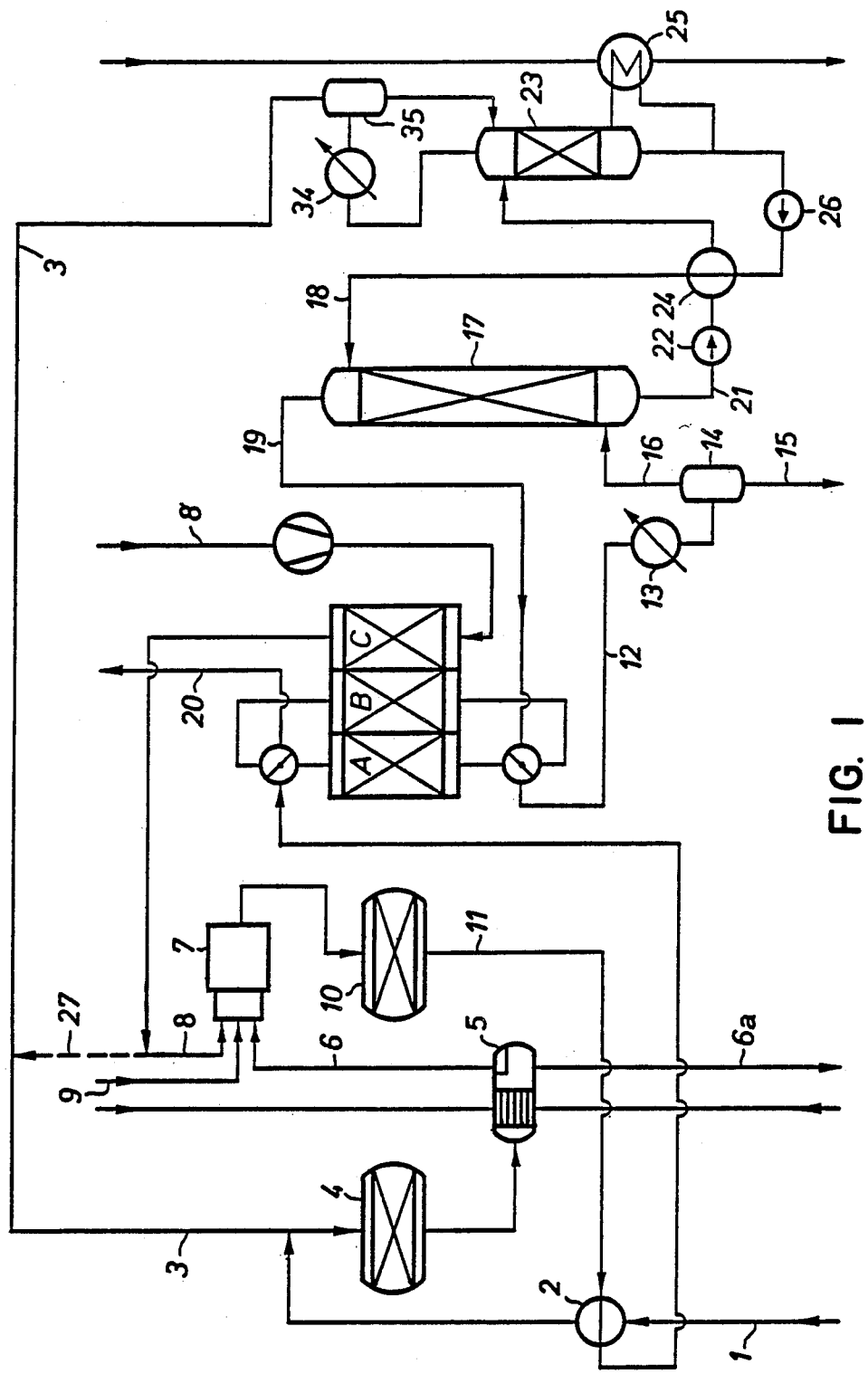
FIG. 1 is a schematic drawing of a preferred embodiment of the invention with cooling of the residual gas against raw gas upstream of regenerators.

According to FIG. 1, the raw gas to be desulfurized enters the plant at 1. In a heat exchanger 2, the gas is preheated in heat exchange with a residual gas, the source of which will be described below.

The preheated gas is mixed with $SO_2$ from conduit 3, the source of which will also be described in detail below, and fed to a reactor 4. This reactor 4 contains a bed of a conventional Claus catalyst (e.g., activated aluminum oxide). The Claus reaction takes place over this catalyst; the reaction is exothermic so that the temperature in the reactor is increased. During the step, only about 50 to 90%, especially about 80% of the $H_2S$ contained in the raw gas is reacted to elemental sulfur. The gas is then cooled in a condenser 5, and the resultant sulfur product is withdrawn via conduit 6a.

In contrast to conventional Claus plants, no attempt is made to improve the prevailing thermodynamic equilibrium in the direction of sulfur formation, either by means of subsequent catalytic Claus stages and/or by suitable subsequent purification processes. Instead, an entirely different approach is used, as follows:

The gas separated in condenser 5 and removed via conduit 6, contains, besides $H_2S$, $SO_2$, and minor amounts of elemental sulfur, the non-reacting components of the raw gas, for example, $CO_2$ and $N_2$, as well as the reaction product water. This gaseous mixture is introduced into a furnace 7 and heated therein with air (or oxygen) fed via conduit 8 and fuel gas from conduit 9. In this operation, air is introduced in slightly over the stoichiometric quantity (preferably about 5% to 25%, especially about 10% excess) in order to ensure complete conversion of $H_2S$ and elemental sulfur into $SO_2$.

There should not be too high an excess of air; otherwise there would be the danger of $SO_3$ formation, thus the maximum $O_2$ excess of 25%. The highly exact metering of the amount of air required in Claus plants for obtaining satisfactory conversion rates is unnecessary in the present process, since the excess oxygen, which would ordinarily shift the chemical equilibrium of the Claus reaction away from sulfur formation and may destroy the catalysts in a conventional Claus plant, thereby being intolerable, is not scrubbed out in the subsequent scrubbing stage. Consequently, the excess oxygen is not recycled into the Claus plant but rather is discharged into the flue with the purified waste gas.

By means of furnace 7, a temperature is maintained at 250°-350° C. At these temperatures, the conversion of $H_2S$ and elemental sulfur to $SO_2$ is very incomplete, e.g., less than 1% conversion. For this reason, an activated aluminum oxide catalyst is employed in a subsequent reactor 10, ensuring complete conversion to $SO_2$. Upon exiting from the exothermic reactor 10, the gas contains, at temperatures of above 350° C., maximally 5 vppm of $H_2S$ and elemental sulfur.

The hot gas is cooled via conduit 11 in heat exchanger 2 and introduced into automatically alternating regenerators A, B, C. In the regenerators, the gas is further cooled, thus condensing a portion of the water formed during the Claus reaction. The thus-cooled gas is withdrawn via a conduit 12, cooled to ambient temperature in a heat exchanger 13 against cooling water, and the resultant condensed water is separated in a phase separator 14 and discharged by way of conduit 15.

The cold gas at a temperature of about generally 15° to 30° C. is conducted via conduit 16 into the lower section of a scrubbing column 17. In the latter, $SO_2$ is scrubbed out of the gas countercurrently to regenerated solvent having the composition according to this invention and a temperature of generally about 0° to 40° C., introduced at the head of the column via conduit 18. The practically entirely sulfur-free gas leaves the column 17 as overhead via conduit 19, is heated in the regenerators while simultaneously cooling same, and passes from there by way of conduit 20 into the flue. This gas can be discharged without harm to the environment since, if anything, it contains merely very minor traces of $SO_2$.

The loaded solvent is discharged from the column at the sump via conduit 21, passed by means of a pump 22 to heat exchanger 24 where it is pretreated countercurrently to regenerated solvent, and then to a regenerating column 23. The dissolved $SO_2$ is thermally removed from the solvent in the regenerating column 23 by steam heating unit 25, also producing in the gaseous phase small amounts of $CO_2$ and other gaseous components of the raw gas. The selectivity of the solvent is, however, so high, in any event, that the $SO_2$ quantity constitutes the main proportion, e.g., at least 80% (dry gas basis), especially 97% by volume (dry gas basis), of the overhead gas leaving the regenerating column. The gas is cooled in cooler 34 to condense solvent vapors. The condensate is separated in phase separator 35 and returned to the head of column 23. The $SO_2$-fraction is admixed to the raw gas via conduit 3 upstream of the Claus plant.

The regenerated scrubbing medium is withdrawn via conduit 18 and introduced into heat exchanger 24 by means of a pump 26, cooled therein, and finally introduced into the head of the scrubbing column 17.

In order to reduce the amount of $H_2S$ remaining downstream of separator 5, an oxidizing catalyst, e.g., Titanium oxide catalysts can be utilized in reactor 4, serving the purpose of oxidizing $H_2S$ to $SO_2$ and simultaneously catalyzing the Claus reaction. The oxygen required for oxidation can then be added to the cycle $SO_2$ as air via the conduit 27, shown in dashed lines.

In connection with the regenerator in the "C" stage, combustion air is preheated thus further cooling the regenerator and covering the fuel requirement in burner 7. (This air preheating increases the process economy, but is not necessary for operation of the process).

An analyzer controls the quantity of air in such a way that, downstream of separator 5, the ratio of $H_2S$ to $SO_2$ is maintained as close to 2 as possible.

Figure 2:
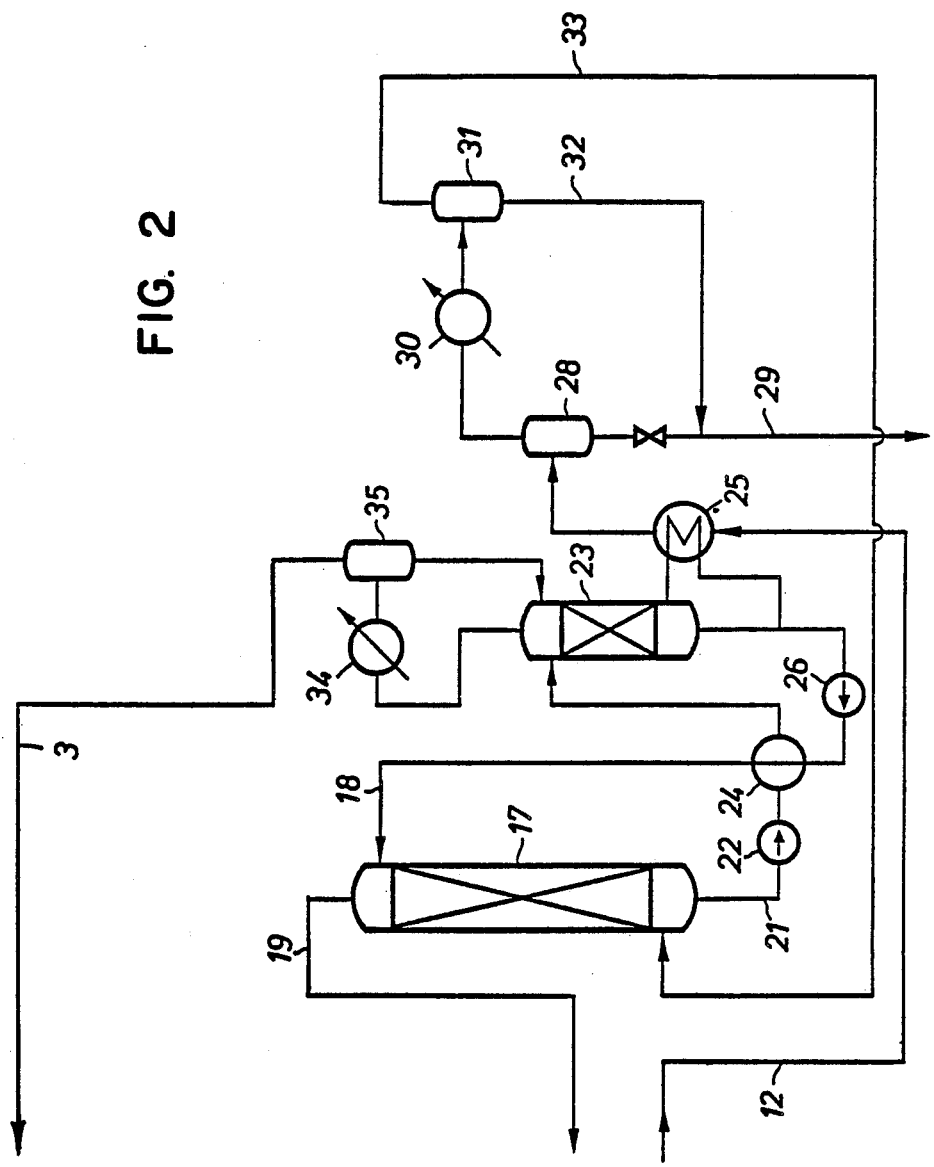
FIG. 2 is a schematic drawing of a preferred embodiment wherein the heat capacity of the gas cooled in regenerators is employed for heating the regenerating column.

FIG. 2 illustrates a preferred embodiment of the process according to this invention wherein the amount of heat contained in the residual gas from the regenerators is usefully consumed and wherein the various apparatus element not herein identified are the same as those of FIG. 1. The gas in conduit 12, cooled in the regenerators, is in this embodiment employed for heating the regenerating column 23 by being cooled in heat exchanger 25 in heat exchange with a side stream of the regenerated solvent. The heat capacity of the gas is entirely sufficient for heating the regenerating column. The resultant cooled gas is introduced into phase separator 28 to separate condensed water which is discharged via conduit 29. The gas from separator 28 can optionally be further cooled in a cooler 30 (e.g., cooling water), thus condensing additional water. This water is separated in a phase separator 31 and admixed via conduit 32 to the condensate in conduit 29. The gas from separator 31 is then introduced via conduit 33 into the lower section of the scrubbing column 17 and treated therein as described.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

Example 1

Purification of a Claus Waste Gas 2,000 kmol/h of raw gas having the following composition:

| | |
|---|---|
| $H_2$ | 0.62 mol % |
| $N_2$ | 58.52 mol % |
| CO | 0.04 mol % |
| $CO_2$ | 1.06 mol % |
| $NH_3$ | 0.10 mol % |
| $H_2S$ | 0.87 mol % |
| $SO_2$ | 0.33 mol % |
| Residual sulfur | 0.16 mol % |
| $H_2O$ | 38.30 mol % | is discharged from the sulfur condenser 5 of the Claus plant and is passed, at about 140°–150° C. and 1.4 bar, to the furnace 7. In the latter, the gas is heated with the aid of 15.9 kmol/h of fuel gas (methane) and 395 kmol/h of air to 280° C. and is then introduced into the catalytic reactor 10. In the latter, all combustible components are converted to $CO_2$, $H_2O$ and $SO_2$. The gas has a temperature of about 500° C. downstream of reactor 10, and contains only maximally 5 vppm of $H_2S$, elemental sulfur, COS, and $CS_2$ at this point. The hot gas is conducted to regenerators A, B, C and cooled therein to about 90° C.

The column 17 is bifunctional is this example. The gas cooled in the regenerators is conducted into the lower section and cooled countercurrently in direct heat exchange relationship with cold cycle water to 40° C. During this process, the water entrained with the gas is most exhaustively condensed out and is withdrawn from the sump of column 17 together with the cycle water.

The cold gas rises into the upper section of column 17 via a flue plate. In this upper section, the $SO_2$ is scrubbed out. The pure gas (1,637.8 kmol/h) leaves the column overhead and is heated in the regenerator to about 250° C. and then discharged into the atmosphere. The pure gas has the following composition:

| | |
|---|---|
| $N_2$ | 89.95 mol % |
| $CO_2$ | 2.28 mol % |
| $SO_2$ | <10 ppm |
| $O_2$ | 0.82 mol % |
| $H_2O$ | 6.95 mol % |

The loaded scrubbing medium is pumped to the regenerating column 23 and therein heated with steam of about 6 bar. The enriched $SO_2$ is withdrawn from separator 35 with about 40° C. and returned into the Claus plant. The $SO_2$-fraction (41 kmol/h) has the following composition:

| | |
|---|---|
| $N_2$ | 1.42 mol % |
| $CO_2$ | 1.71 mol % |
| $SO_2$ | 96.87 mol % |

-continued

| H₂O | saturated. |

The scrubbing liquid employed has the following composition:

| 70% tetraethylene glycol dimethyl ether |
| 20% triethylene glycol dimethyl ether |
| 5% pentaethylene glycol dimethyl ether |
| 5% mono ethers. |

Example 2

Processing of a Claus Gas Low in Sulfur

The plant is supplied via conduit 1 with 1,000 kmol/h of a raw gas having the following composition:

| $H_2S$ | 8.0 mol % |
| $N_2$ | 5.0 mol % |
| $CO_2$ | 87.0 mol % |

The gas is preheated in heat exchanger 2 to about 240° C. Via conduit 3, 52 kmol/h of cyclic $SO_2$ is admixed to the raw gas. This has the following composition:

| $SO_2$ | 77.78 mol % |
| $CO_2$ | 15.28 mol % |
| $H_2O$ | 6.94 mol % |

The Claus reaction then takes place in reactor 4 with the formation of elemental sulfur. Most of the latter is withdrawn in the liquid phase in condenser 5, the thus-obtained quantity of sulfur being equal to the amount of sulfur contained in the raw gas. The conversion rate, however, based on the sum total of raw gas and cycle $SO_2$ is only about 75–80%, the recovery rate only about 67%.

Via conduit 6, 1028 kmol/h of a gas containing $H_2S$, $SO_2$, sulfur vapor, and sulfur droplets is conducted to the furnace 7; this gas has the following composition:

| $H_2S$ | 1.57 mol % |
| $SO_2$ | 0.78 mol % |
| $S_2$ | 0.78 mol % |
| $N_2$ | 4.68 mol % |
| $CO_2$ | 85.41 mol % |
| $H_2O$ | 6.61 mol % |

Fuel gas is burned in the furnace 7, and the hot combustion waste gases are mixed with the gas from condenser 5. Thereby a temperature of about 280° C. is obtained at the inlet of reactor 10. At that location, $H_2S$ and sulfur vapor are burned to $SO_2$ with the concomitant formation of traces of $SO_3$. This hot gas is first heat exchanged in a heat exchanger (not shown) for steam generation and thereafter is cooled in heat exchanger 2 against cold raw gas to about 330° C. The gas finally is subjected to further cooling to about 100° C. in one of the regenerators A/B/C, and to a final cooling step to about 40° C. in water cooler 13. Condensed water is withdrawn from separator 14. The resultant cooled gas depleted in condensed water is the conducted into the scrubbing column 17 where the $SO_2$ is scrubbed out. The pure gas leaves the column 17 via conduit 19 and is heated to about 200° C. in one of the regenerators A/B/C before being discharged into the outside flue. The thus-discharged 1,310 kmol/h of pure gas has the following composition:

| $SO_2$ | 10 ppm |
| $O_2$ | 0.38 mol % |
| $N_2$ | 25.95 mol % |
| $CO_2$ | 66.04 mol % |
| $H_2O$ | 7.63 mol % |

The loaded scrubbing medium is regenerated in regenerating column 23 and the released gas is recycled to reactor 4 via heat exchanger 34, phase separator 35 and conduit 3.

The scrubbing liquid employed in this example is the same as in example 1.

Example 3

Processing of a Claus Gas Rich in Sulfur

Via conduit 1, there is fed into the plant 1,000 kmol/h of a raw gas of the following composition:

| $H_2S$ | 85.0 mol % |
| $CO_2$ | 15.0 mol % |

In this example, the gas is treated in a Claus furnace, but with conversions to sulfur lower than in a conventional Claus installation, e.g., about 60% conversion in this example compared to up to 70% in a Claus plant. In this example, the heat exchanger 2 is eliminated. While, in a conventional Claus plant, one-third of the $H_2S$ is oxidized to $SO_2$, only about 17% of the $H_2S$ need be so oxidized in this example. Downstream of the burner, cycle $SO_2$ is admixed in the reaction chamber of the Claus furnace. In a waste-heat recovery unit, the heat of reaction of the Claus reaction is used for steam generation. At this point, then, about 60% of the entire sulfur from the raw gas and from the cycle $SO_2$ has been converted into elemental sulfur. The Claus furnace, upstream of Claus reactor 4, is not shown in FIG. 1.

In principle, a sulfur condenser can then follow, as in a conventional Claus plant. Since maximizing of the conversion rate at this point does not afford any great advantage in the present process, the process foregoes the somewhat higher sulfur yield in the subsequent stages by condensation of the elemental sulfur downstream of the waste-heat recovery unit. Instead, the gas is conducted into reactor 4 together with the elemental sulfur formed in the thermal stage. In this reactor 4, the Claus reaction is again conducted, the rise in temperature being impeded by the elemental sulfur already contained in the gas. Downstream of reactor 4, the gas has a temperature of about 380° C.

In condenser 5, the thus-produced elemental sulfur is then withdrawn. The quantity corresponds to about 80% of the sulfur contained in the raw gas and in the cycle $SO_2$. Via conduit 6, 1,855 kmol/h of a gas having the following composition is discharged from condenser 5:

| $H_2S$ | 5.93 mol % |
| $SO_2$ | 2.97 mol % |
| $S_2$ | 1.46 mol % |
| $N_2$ | 41.67 mol % |
| $CO_2$ | 8.08 mol % |

-continued

| | |
|---|---|
| H₂O | 39.89 mol % |

This gas is reacted in furnace 7 without feeding fuel gas. A catalytic post-combustion step is unnecessary owing to the high combustion temperature of about 800° C. The thus-produced heat is recovered in a waste-heat recovery unit for steam generation. The gas then enters, at a temperature of about 280° C., one of the regenerators A/B/C and is cooled therein to about 120° C. Since the gas still contains a large amount of steam, it is cooled in the lower section of column 17 by a water cycle in direct heat exchange to about 40° C., thus condensing water.

Via a flue plate, the cold gas enters the scrubbing section of column 17 where SO₂ is scrubbed out. Via conduit 19, pure gas in an amount of 1,907.02 kmol/h is discharged from the column, preheated in one of the regenerators A/B/C to about 200° C., and then conducted into the outside flue. The gas has the following composition:

| | |
|---|---|
| SO₂ | 10 ppm |
| O₂ | 1.00 mol % |
| N₂ | 83.74 mol % |
| CO₂ | 7.76 mol % |
| H₂O | 7.50 mol % |

The loaded scrubbing medium is regenerated in regenerating column 23, thereby obtaining the SO₂ cycle gas which is recycled via 34, 35 and 3. The cycle gas is obtained in an amount of 224.4 kmol/h and has the following composition:

| | |
|---|---|
| SO₂ | 98.04 mol % |
| N₂ | 0.22 mol % |
| CO₂ | 0.85 mol % |
| H₂O | 0.89 mol % |

The scrubbing liquid employed in this example is the same as in example 1.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for purifying a Claus tail gas stream discharged from a Claus plant containing H₂S, SO₂, CO₂ and water; said process comprising oxidizing said Claus tail gas to convert the H₂S to SO₂; cooling resultant oxidized gas, and subjecting cooled oxidized gas to a scrubbing stage comprising scrubbing and regeneration steps to separate SO₂ which is later recycled to said Claus plant, the scrubbing being conducted in a scrubbing column; the improvement which comprises cooling the oxidized gas to 60°–120° C., further cooling said oxidized gas to about 15°–40° C., and employing as the scrubbing agent a physical solvent at about 0°–40° C. on a dry basis, consisting essentially of 60–80% of tetraethylene glycol dimethyl ether; 15–25% of triethylene glycol dimethyl ether; 2.5–7.5% of pentaethylene glycol dimethyl ether; and 2.5–7.5% of mono ethers.

2. A process according to claim 1, wherein the oxidized gas, before being cooled to 60°–120° C., is cooled in heat exchange with Claus plant feed gas.

3. A process according to claim 2, wherein regenerators are utilized to cool said oxidized gas to 60°–120° C.

4. A process according to claim 3, further comprising passing said Claus tail gas, prior to the oxidation step, through the regenerators in order to cool the regenerators.

5. A process according to claim 1, wherein the solvent, on a dry basis, consists essentially of 70% of tetraethylene glycol dimethyl ether; 20% of triethylene glycol dimethyl ether; 5% of pentaethylene glycol dimethyl ether; and 5% of mono ethers.

6. A process according to claim 1, wherein regenerators are utilized to cool said oxidized gas to 60°–120° C.

7. A process according to claim 6, further comprising passing air or oxygen through the regenerators in order to cool the regenerators.

8. A process according to claim 6, further comprising passing a sulfur-free gas through the regenerators in order to cool the regenerators.

9. A process according to claim 6, further comprising passing said Claus tail gas, prior to the oxidation step, through the regenerators in order to cool the regenerators.

10. A process according to claim 4, wherein the solvent, on a dry basis, consists essentially of 70% of tetraethylene glycol dimethyl ether; 20% of triethylene glycol dimethyl ether; 5% of pentaethylene glycol dimethyl ether; and 5% of mono ethers.

11. A process according to claim 1, wherein said regeneration step is conducted in a regeneration column and said oxidized gas is further cooled to about 15°–40° C. in heat exchange with bottom liquid from said regeneration column.

* * * * *